April 28, 1936. A. HANIQUE 2,038,655
METER FOR GRANULAR MATERIAL
Filed Oct. 13, 1934
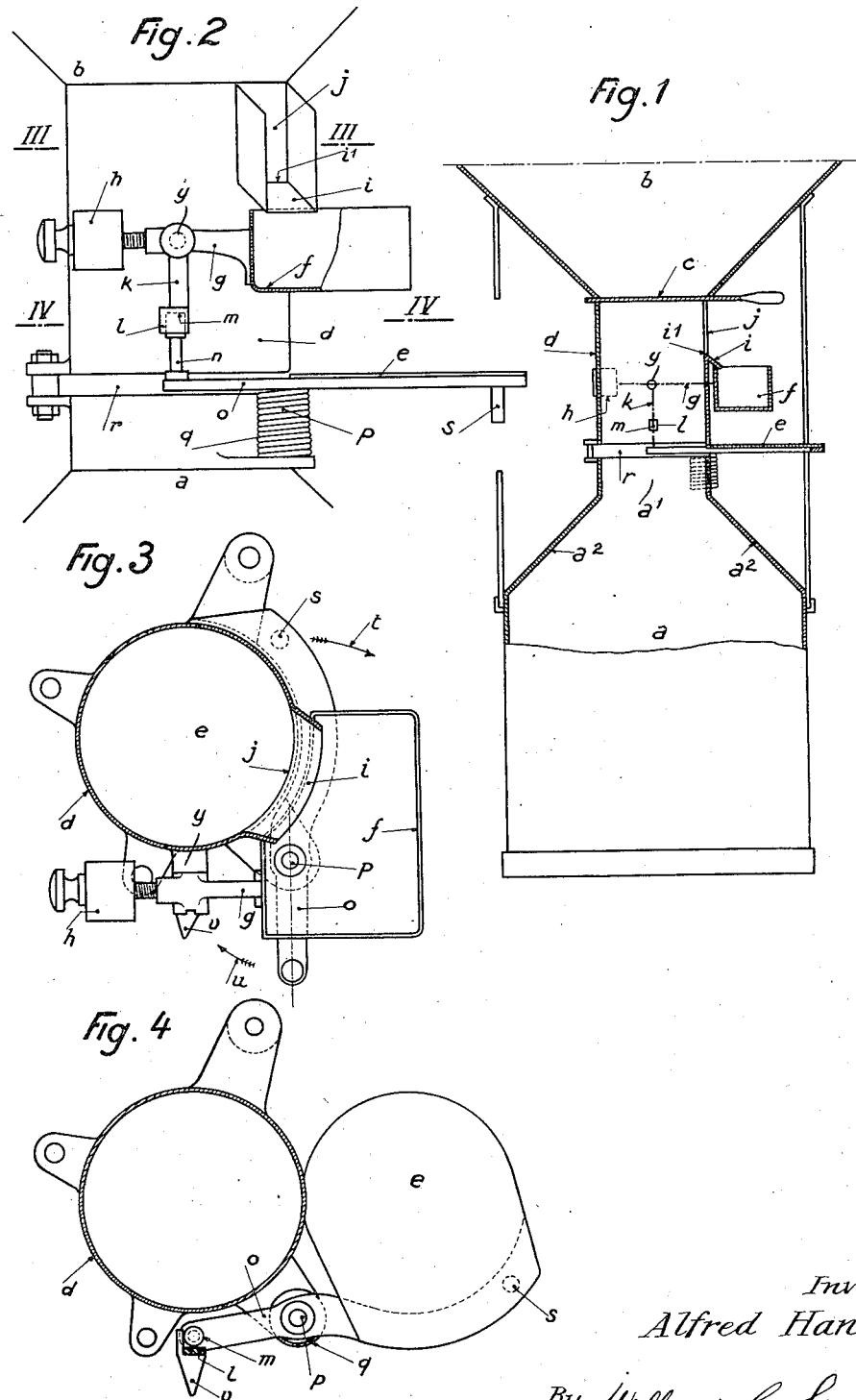
Inventor,
Alfred Hanique.
By William C. Linton.
Attorney.

Patented Apr. 28, 1936

2,038,655

UNITED STATES PATENT OFFICE 2,038,655

METER FOR GRANULAR MATERIAL

Alfred Hanique, Paris, France

Application October 13, 1934, Serial No. 748,223
In France October 13, 1933

1 Claim. (Cl. 73—131)

The weight of a granular material contained in a container of a determined capacity varies according to the compression to which it is subjected. It is therefore necessary in order to effect comparative weighings of grain to operate under a never varying compression.

The invention has for its object a meter which permits to gauge a determined volume of granular material under unvarying compression in which the compression is obtained by means of an unvarying height of this material corresponding to a determined level, from the fact that the material which flows off after reaching this level causes by its mass the releasing of a mechanism which liberates a part effecting an automatic levelling of the material at the aperture of the meter container which is thus isolated from the remainder of the material. This mechanism comprises a container mounted on a vacillating lever and into which the material falls after having reached the determined level, the weight of this material determining at a given moment the pivoting of the lever which liberates the part for levelling, which is subjected to the action of a spring.

According to the invention, the apparatus is characterized by the arrangements made for ensuring the entire filling up of the meter container of which the feeding aperture is however much reduced in order to minimize errors, by the arrangements of the sliding blade ensuring the instantaneous separation of the meter container without pressure on the grain and by the arrangements of the weighing system with adjustable counterbalance.

In the accompanying drawing which represents the apparatus by way of example:

Fig. 1 is a diagrammatical view of the whole device partly in a vertical section;

Fig. 2 is, on a larger scale, an exterior view of the tube joining the meter container with the feeding container;

Fig. 3 is a horizontal section according to the line III—III in Fig. 2 with the levelling blade in a closed position;

Fig. 4 is a horizontal section according to the line IV—IV in Fig. 2 with the levelling blade in an open position.

The apparatus substantially comprises a lower container $a$ of a determined volume constituting the meter container and of which the feeding aperture $a^1$ is of much smaller section than that of the body of this container. In order to ensure the entire filling up of the said container, the body of this is joined to the aperture $a^1$ by a wall suitably inclined $a^2$. This meter container $a$ is surmounted by a conical feeding hopper $b$ of a larger volume, fitted at its lower part with a trapdoor $c$.

Between the container $a$ and the hopper $b$, a tube $d$ is arranged rigid with the said hopper $b$ and to which is joined at $r$, by means of an appropriate removable connection, the apertured portion $a^1$ of the meter container $a$. This tube $d$ holds the levelling blade $e$ with the releasing mechanism.

This mechanism comprises the equalizing container $f$ mounted upon the extremity of the vacillating lever $g$ pivotally connected at $y$ to the outside of tube $d$ and balanced on the other hand by the adjustable counterbalance $h$ so that it moves in a plane parallel to tube $d$. This container $f$ is normally arranged horizontally under the spout $i$ which latter extends from the lower edge $i^1$ of the overflow opening $j$ formed within the tube $d$.

An arm $k$ rigid with the lever $g$ extends down and pivots with it. At its lower extremity, this arm forms a retaining block $l$ behind which it is possible to place the head $m$ of the column $n$ fixed at the extremity of a lever $o$ articulated at the fixed point $p$ and carrying beyond this fixed point, the levelling blade $e$. A strong spring $q$ coiled round the pivoting bolt $p$ tends to always bring the said blade $e$ back to its closed or levelling position, across the tube $d$ in the separating space $r$. A finger $s$ fixed beneath the stays of the levelling blade allows this to be placed in the open position against the action of the spring $q$, by withdrawing it in the direction indicated by the arrow $t$. The lever $o$ therefore displaces itself in the direction indicated by the arrow $u$ (Fig. 3) and the head $m$ of the column $n$ sliding on to the inclined nose $v$ of the arm $k$ compels this to pivot towards the left until the said head $m$ comes to place behind the retaining block $l$ of the arm $k$. As soon as the head $m$ has passed behind the block $l$, the arm $k$ and lever $g$ pivot about their junction and the said block holds $m$, thereby retaining the blade $e$ in an inoperative position until $f$ is full of material and drops, thereby allowing block $l$ to raise off of head $m$ to let blade $e$ close tube $d$.

The working of the apparatus is the following:

The trapdoor $c$ being closed, the upper feeding container $b$ is filled and the arrangement is ready for action as has been said, the passage in the tube $d$ being thus completely free. The trapdoor $c$ is then opened. The grain, passing through the said tube, descends into the meter container $a$ and fills it progressively, then it rises in the tube $d$ up to the unvarying level determined by the horizontal edge $i^1$ of the overflow opening $j$ and flows into the equalizing container $f$. When a determined weight of grain has fallen into this container $f$, this weight provokes the action of the pivoting system $g$—$k$ which liberates, by the means described above, the levelling blade $e$, which under the action of the spring $q$ cuts the column of grain abruptly and stops its flow by isolating the meter container from the remainder of the material contained in the upper part of the apparatus.

The full container $a$ can then be separated from the tube $d$ and its contents may then be submitted to suitable weighing operations.

It will be seen that, through its pivoting movement, the blade $e$ cuts the column of grain by sliding along this column without exercising any pressure on the grain which ensures an instantaneous levelling, without any modification of the upper section of grain in the meter container. The possibility of error, even slight, is further minimized by the greatly reduced section of the aperture $a^1$. By connecting the lower end of the tube $d$ to the upper end of the container $a$ by means of an appropriate removable connection, the tube and the weighting mechanism carried thereby may be bodily removed from the container $a$ and the space $r$ provided is of a height as to permit the blade $e$ to pass therethrough, but not a height as to permit the grain to flow out of the tube $d$. After each operation, the container $f$ is emptied by scooping or otherwise removing the grain therefrom.

I claim:

A meter for gauging a determined volume of granular material under unvarying compression comprising in combination: a meter container with a reduced aperture joined to the body of this container by an inclined wall; a feeding hopper having a tube of a diameter corresponding to that of the aperture of the meter container with which it is joined; an equalizing container, a vacillating lever carried by this tube and carrying said equalizing container balanced by an adjustable counterbalance; means to make the grain overflow into this equalizing container when it has reached a determined level in the above mentioned tube; a levelling blade, a lever holding said levelling blade pivoting and drawn by a spring to place itself across the above mentioned tube; an arrangement for the clutching of this blade holding lever able to be liberated when the balancing lever is put into action under the effect of the load of grain overflowed into the equalizing container; and means for releasing this arrangement when the lever carrying the said equalization container vacillates.

ALFRED HANIQUE